United States Patent
Mueller et al.

[11] Patent Number: 6,151,126
[45] Date of Patent: Nov. 21, 2000

[54] ROTATIONAL RATE COMPARATOR FOR A FIBER OPTIC GYROSCOPE WITH A 3×3 COUPLER

[75] Inventors: Reinhard Mueller, Puchheim; Gert Trommer, Munich, both of Germany

[73] Assignee: LFK Lenkflugkoerpersysteme GmbH, Munich, Germany

[21] Appl. No.: 09/251,857

[22] Filed: Feb. 17, 1999

[30] Foreign Application Priority Data

Feb. 17, 1998 [DE] Germany ............ 198 06 423

[51] Int. Cl.[7] .................................. G01C 19/72
[52] U.S. Cl. ............................................. 356/466
[58] Field of Search ............................. 356/350

[56] References Cited

U.S. PATENT DOCUMENTS 5,636,022  6/1997  Priest ........................ 356/350

*Primary Examiner*—Samuel A. Turner
*Attorney, Agent, or Firm*—Evenson, McKeown, Edwards & Lenahan, P.L.L.C.

[57] ABSTRACT

A rotational rate comparator for a fiber optic gyroscope has a 3×3 coupler and an evaluating computer to calculate the rotational rate from photodiode signals generated by the fiber optic gyroscope. An electrical circuit is provided that is independent of the evaluating computer, and embodies an algorithm for producing at least one signal that depends on the rotational rate as a function of the photodiode signals. When the rotational rate dependent signal exceeds at least one presettable limiting value the comparator supplies an output signal.

3 Claims, 2 Drawing Sheets

ROTATIONAL RATE COMPARATOR FOR A FIBER OPTIC GYROSCOPE WITH A 3×3 COUPLER

BACKGROUND AND SUMMARY OF THE INVENTION

This application claims the priority of German patent document 198 06 423.3, filed Feb. 17, 1998, the disclosure of which is expressly incorporated by reference herein.

The invention relates to a rotational rate comparator.

A fiber optic gyroscope with 3×3 coupler disclosed in U.S. Pat. No. 4,440,498 operates close to quadrature because of the 3×3 coupler, without need of a modulator. The further development of such a gyroscope and especially the gyroscope signal evaluation is described in Applied Optics, Volume 29, No. 36, pp. 53–60, Dec. 20, 1990. In the signal evaluation, the total and differential signals of the two photodiodes are used primarily. These photodiodes are located at the outputs of the 3×3 coupler as a direct extension of the fiber coil. To calculate the exact Sagnac phase, and hence the rotational rate, a plurality of factors and constants must be taken into account, so that an evaluating computer is necessary for evaluation. Nevertheless, fiber optic gyroscopes of this kind can now be manufactured so economically, and with sufficient accuracy, that they are suitable for use in missiles. Particularly in this case it has proven to be important to determine in a very short time whether a missile is exceeding a safety-critical rotational rate.

The object of the present invention is to provide a fiber optic gyroscope such as described above, which is both sturdy and economical, and which can fulfill this safety function.

These and other objects and advantages are achieved by the fiber optic gyro according to the invention, which includes an electrical circuit which is independent of the evaluating computer, and which includes logical elements that embody an algorithm for producing at least one output signal that depends on the rotational rate based on the photodiode signals. When such output signal exceeds at least one presettable limit the electrical circuit supplies an output signal.

The invention deliberately avoids using software-dependent data from the evaluating computer. Instead, it implements the algorithm via a fixed electrical circuit, so that a signal that depends on the rotational rate is generated directly from the photodiode signals. This rotational-rate-dependent signal can then also be compared with a given limiting value in a simple, software-independent manner.

For this purpose, a value that depends on the rotational rate, and which is relatively simple to form and largely free of other problems, is the quotient of the differential and total signals of the two photodiodes mentioned above. By suitable mathematical manipulation, an inequality can be developed for the limit consideration which utilizes, instead of a quotient, only additions and multiplications, and can be implemented simply with electrical adders, multipliers, and bistable flip-flops. As a result, it is possible to determine especially rapidly and reliably the rotational rate limiting values independently of the evaluating computer, so that even safety functions can be linked to it.

Other objects, advantages and novel features of the present invention will become apparent from the following detailed description of the invention when considered in conjunction with the accompanying drawings.

DETAILED DESCRIPTION OF THE DRAWINGS

Figure 1:
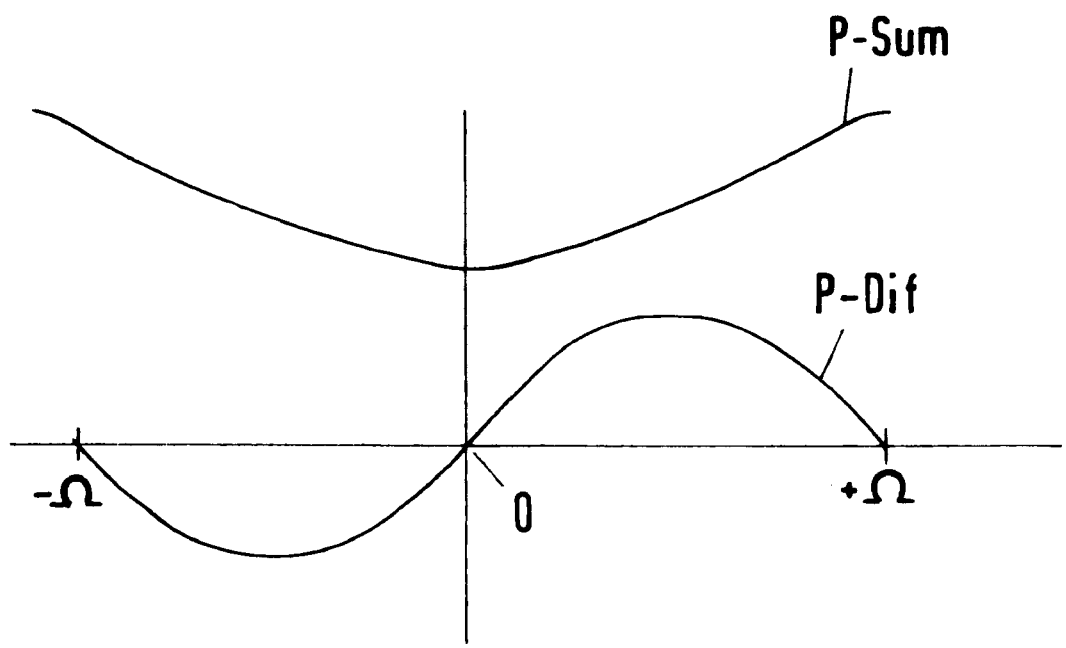
FIG. 1 shows curves which represent the total and differential signals of the photodiodes in a fiber optic gyroscope as a function of the rotational rate.

The signal curve shown in FIG. 1 is based on a fiber optic gyroscope with 3×3 couplers, as is known for example from German patent document DE 39 12 005 C2. The signal P-Sum is formed from the total of the signals P2 and P3 at the output of the 3×3 couplers of the fiber optic gyroscope, while the signal P-Dif is formed by the difference between the two signals. The differential signal P-Dif has a sinusoidal curve with three zero points—at a rotational rate of zero as well as at plus and minus Ω.

For a first limiting value consideration, the passage through zero must be eliminated for a rotational rate of zero. Thus, as the first condition, the total signal P-Sum must be greater than a value L2 that can be specified. In other words:

$$P2+P3>L2.$$

For reasons of scaling, the total signal can also be provided with a scaling factor n, so that:

$$n(P2+P3)>L2.$$

Alternatively, the limiting value L2 can also be linked with the reference signal P1 of a monitor diode in the light feed line of the 3×3 coupler. The inequality then reads:

$$n'(P2+P3)>L2.P1.$$

As the second condition, the quotient of the differential signal P-Dif and the total signal P-Sum, supplemented by a symmetrizing value k, must not exceed a limiting value L1. The inequality then reads:

$$|P2-P3+k(P2+P3)|<L1(P2+P3).$$

If both of the above conditions are met, which is tested by a logical AND link, the set rotational rate limiting value is reached.

Figure 2:
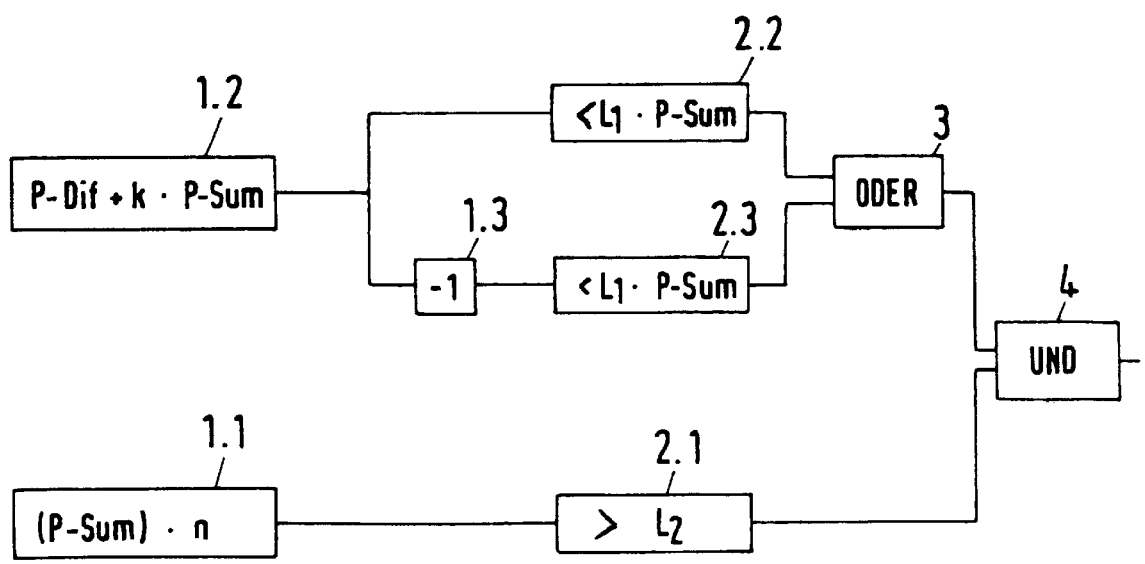
FIG. 2 is a block diagram of a rotational rate comparator for a fiber optic gyroscope.

A block diagram of a hard-wired electrical circuit which embodies the above-mentioned inequalities, is shown in FIG. 2. In a first adder 1.1 the sum of the signals P2 and P3, possibly multiplied, are formed with the scaling factor n. In a bistable flip-flop 2.1 (a Schmitt trigger for example), the output signal from 1.1 is compared with the limiting value L2. The output of the flip-flop is switched from logical zero to logical one when this limiting value is exceeded.

In a parallel branch of the circuit, the sum of a differential signal between P2 and P3 and a total signal composed of P2 and P3 multiplied by a constant symmetry factor k is formed in an adder or multiplier 1.2. The result is compared in a bistable flip-flop 2.2 with the product of the limiting value L1 and the total signal P-Sum. Parallel thereto, the result output from the adder or multiplier 1.2 is multiplied by the value −1 in a multiplier 1.3, and is compared in another bistable flip-flop 2.3 with the same value as in 2.2. The two outputs of the bistable flip-flops 2.2 and 2.3 which are at logical one or logical zero are fed to a logical OR circuit 3, whose output together with the output of bistable flip-flop 2.1 is supplied to a logical AND member 4. The output of this stage 4 then supplies as a logical zero or logical one, an output signal which indicates whether or not the specified rotational rate limiting value have been exceeded.

A second possibility for determining a rotational rate limiting value is essentially the opposite of the solution described above, and is mainly based on the fact that the passages through zero shown in FIG. 1 are filtered out at rotational rates of plus and minus $\Omega$. Thus, only the area of the passage through zero at the rotational rate of zero is considered. If the rotational rate exceeds a specific value defined by L3 at the rotational rate of zero, an output signal must be delivered. For this purpose, the circuit elements 1.1, 2.1, and 4 shown in FIG. 2 can be omitted. In addition, the value <L1.P-Sum is replaced in bistable flip-flops 2.2 and 2.3 by >L3.P-Sum.

For the two circuit examples described above, the output signal is independent of power fluctuations in the light source of the fiber optic gyroscope. In addition, by using a hard-wired circuit, the failure of the light source can also be detected by formation of the inequality P-Sum>L4. The limiting value L4 is chosen so that the positive yet small total signal applied at a rotational rate $\Omega=0$ has fallen under a limiting value that would indicate the failure of the light source. The respective limiting values L1 to L4 are realized in concrete form and adjusted using suitably selected resistances.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotational rate comparator for a fiber optic gyroscope with a 3×3 coupler, for calculating a rotational rate from photodiode signals of the fiber optic gyroscope, said comparator comprising an electrical circuit that is independent of an evaluating computer, said electrical circuit including discrete logic components that embody an algorithm for producing at least one rotational rate signal that is dependent on the rotational rate based on signals from the photodiode, and said electrical circuit generating an output signal when said rotational rate signal exceeds at least one presettable limiting value; wherein the following inequalities are embodied in the electrical circuit:

$$|P_2-P_3+k(P_2+P_3)|<L1(P_2+P_3),$$

connected by a logical AND link with one of the following $$P_2+P_3>L2,$$

$$n(P_2+P_3)>L2,$$

and $$n'(P_2+P_3)>L2.P1$$

where

P1=signal from a monitor diode of the fiber optic gyroscope,

P2=signal from a second photodiode of the fiber optic gyroscope,

P3=signal from a second photodiode of the fiber optic gyroscope, k, n, n'=constants, L1=limiting value of maximum or minimum rotational rate, and L2=limiting value for excluding the rotational rate of zero.

2. The rotational rate comparator according to claim 1 wherein the electrical circuit further embodies the following inequality:

$$|P2-P3+k(P2+P3)|>L3(P2+P3)$$

where L3 is the limiting value of maximum or minimum rotational rate.

3. Rotational rate comparator according to claim 1 wherein the electrical circuit comprises exclusively analog electronics components.

* * * * *